(12) United States Patent
Trumbo et al.

(10) Patent No.: US 8,908,340 B2
(45) Date of Patent: Dec. 9, 2014

(54) SWITCHED TRANSIENT VOLTAGE SUPPRESSION CIRCUIT

(75) Inventors: Dale Trumbo, Tucson, AZ (US); Alex Wedin, Tucson, AZ (US); Paul Stevens, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 390 days.

(21) Appl. No.: 13/412,058

(22) Filed: Mar. 5, 2012

(65) Prior Publication Data

US 2013/0229055 A1    Sep. 5, 2013

(51) Int. Cl.
*H02H 9/00*    (2006.01)

(52) U.S. Cl.
USPC .......................................................... 361/56

(58) Field of Classification Search
USPC .......................................................... 361/56
See application file for complete search history.

(56) References Cited

U.S. PATENT DOCUMENTS

| | | | | |
|---|---|---|---|---|
| 5,343,053 | A | * | 8/1994 | Avery ........................... 257/173 |
| 6,594,132 | B1 | * | 7/2003 | Avery ........................... 361/111 |
| 7,106,573 | B2 | | 9/2006 | Kucharski |
| 7,280,332 | B2 | * | 10/2007 | Ma et al. ...................... 361/91.1 |
| 7,742,265 | B2 | * | 6/2010 | Rice ................................. 361/56 |
| 7,933,102 | B2 | | 4/2011 | Mallikararjunaswamy |
| 2009/0268361 | A1 | | 10/2009 | Millikarjunaswamy |
| 2010/0244090 | A1 | | 9/2010 | Bobde et al. |

OTHER PUBLICATIONS

Lepkowski J., et al.; Zener Diode Based Integrated Filters, an Alternative to Traditional EMI Filter Devices.

* cited by examiner

*Primary Examiner* — Stephen W Jackson
(74) *Attorney, Agent, or Firm* — Ingrassia Fisher & Lorenz, P.C.

(57) ABSTRACT

A transient voltage suppression circuit includes a voltage suppression circuit, a switch activation circuit, and a solid-state switch. The switch activation circuit is configured to selectively supply a switch activation signal. The solid-state switch is electrically connected in series with the voltage suppression circuit, is coupled to receive the switch activation signal selectively supplied by the switch activation circuit, and is configured, in response to the switch activation signal, to switch from an OFF state to an ON state.

18 Claims, 4 Drawing Sheets

SWITCHED TRANSIENT VOLTAGE SUPPRESSION CIRCUIT

TECHNICAL FIELD

The present invention generally relates to transient voltage suppression, and more particularly relates to a switched transient voltage suppression circuit.

BACKGROUND

Many electronic systems installed on aircraft include some form of lightning protection. Typically, such electronic systems include one or more transient voltage suppression (TVS) circuits, which are configured to clamp the relatively high magnitude voltages associated with a lightning strike. In many instances, a TVS circuit is implemented with one or more TVS diodes. Unfortunately, many TVS diodes exhibit variability in clamping voltage and relatively large leakage currents. The clamping voltage variability can make it difficult to protect relatively sensitive electronics that can be damaged at voltages only slightly higher than normal operating voltage ranges. The relatively large leakage currents can make these devices undesirable for electronic systems that are connected to a battery bus.

Hence, there is a need for a TVS circuit that does not exhibit clamping voltage variability and/or does not exhibit relatively large leakage currents. The present invention addresses at least this need.

BRIEF SUMMARY

In one embodiment, a switched transient voltage suppression circuit includes a voltage suppression circuit, a switch activation circuit, and a solid-state switch. The voltage suppression circuit is adapted to be coupled to a power supply rail. The switch activation circuit is adapted to be coupled to at least the power supply rail and is configured to selectively supply a switch activation signal. The solid-state switch is electrically connected in series with the voltage suppression circuit and is adapted to be coupled to a return rail. The solid-state switch is further coupled to receive the switch activation signal selectively supplied by the switch activation circuit and is configured, in response to the switch activation signal, to switch from an OFF state to an ON state. In the OFF state, the voltage suppression circuit is electrically isolated from the return rail, and in the ON state, the voltage suppression circuit is electrically coupled to the return rail.

In another embodiment, a circuit for supplying electrical power to one or more electrical loads includes a direct current (DC) power source, a voltage suppression circuit, a switch activation circuit, and a solid-state switch. The DC power source is coupled to a DC supply rail and a return rail and is configured to supply electrical power at a DC voltage magnitude, as measured between the DC supply rail and the return rail. The voltage suppression circuit is coupled to the DC supply rail. The switch activation circuit is coupled to at least the DC supply rail and is configured to selectively supply a switch activation signal. The solid-state switch is electrically connected in series with the voltage suppression circuit and the return rail. The solid-state switch is further coupled to receive the switch activation signal selectively supplied by the switch activation circuit and is configured, in response to the switch activation signal, to switch from an OFF state to an ON state. In the OFF state, the solid-state switch electrically isolates the voltage suppression circuit from the return rail. In the ON state, the solid-state switch electrically couples the voltage suppression circuit to the return rail.

Furthermore, other desirable features and characteristics of the switched transient voltage suppression circuit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
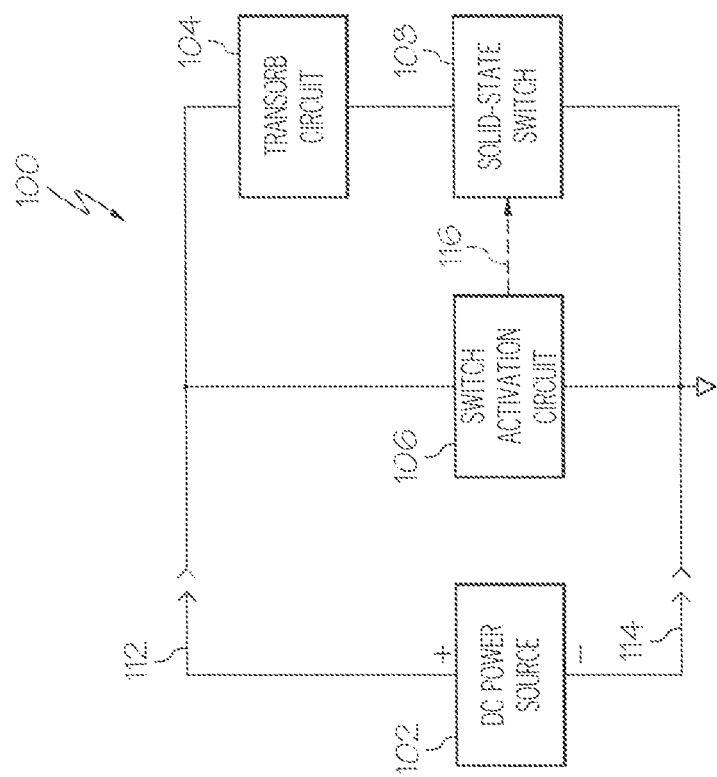
FIG. 1 depicts a functional block diagram of an embodiment of a switched transient voltage suppression (TVS) circuit.

Referring to FIG. 1, a functional block diagram of an embodiment of a switched transient voltage suppression (TVS) circuit 100 is depicted and includes a voltage suppression circuit 104, a switch activation circuit 106, and a solid-state switch 108. The TVS circuit 100 is coupled to a direct current (DC) power source 102, via a DC supply rail 112 and a return rail 114. The DC power source 102 is configured to supply electrical power at a DC voltage magnitude, as measured between the DC supply rail 112 and the return rail 114. It will be appreciated that the DC voltage magnitude may vary, depending on the particular application and or environment in which the TVS circuit 100 is installed. For example, if the TVS circuit 100 is installed in an aircraft, the DC voltage magnitude may be 28 VDC.

Figure 2:
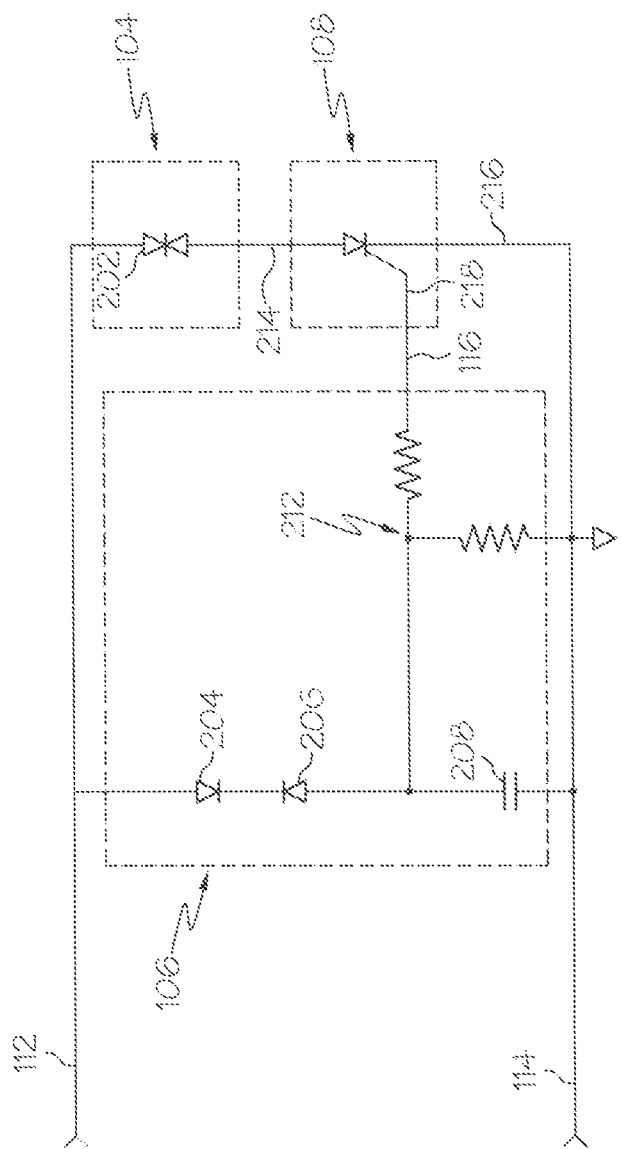
FIG. 2 depicts a schematic diagram of one particular implementation of the switched TVS circuit depicted in FIG. 1.
Figure 3:
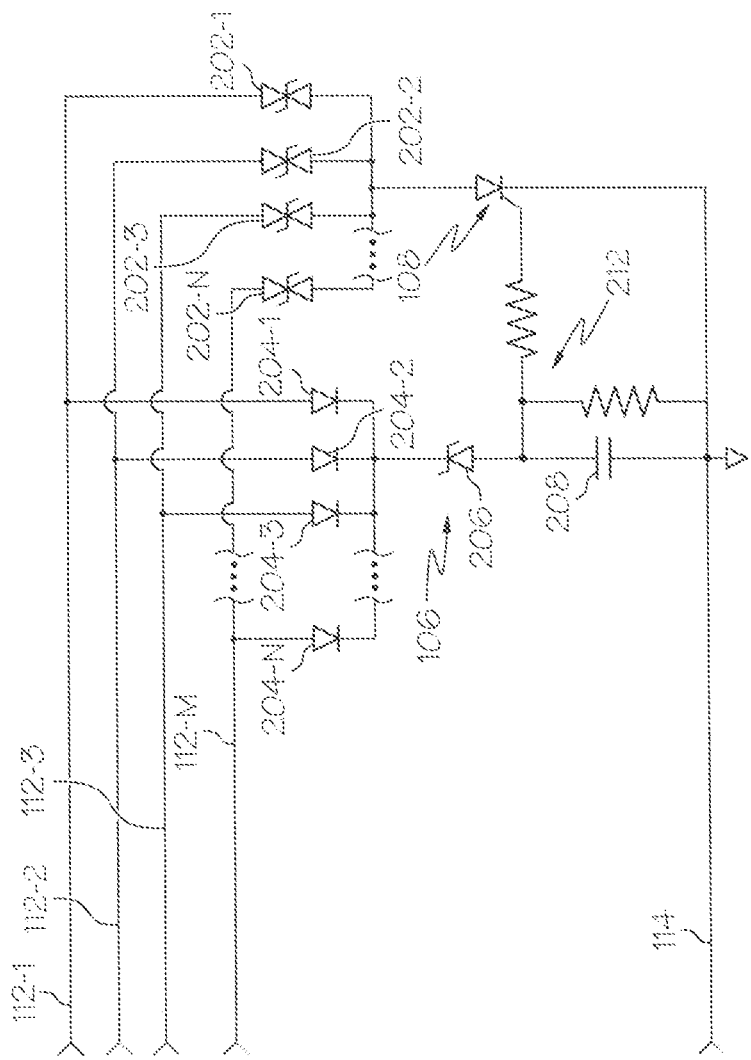
FIG. 3 depicts a schematic diagram of another particular implementation of the switched TVS circuit depicted in FIG. 1 for protecting multiple circuits.

Moreover, in the depicted embodiment, the DC power source 102 is connected to the DC supply rail 112 and the return rail 114 such that the DC supply rail 112 is at a positive DC voltage relative to the return rail 114. It will be appreciated that in other embodiments the DC supply rail 112 could be at a negative DC voltage relative to the return rail 114. It will additionally be appreciated that if the DC supply rail 112 is at a negative DC voltage relative to the return rail 114, the electrical connections of some of the circuit components discussed below will differ from what is depicted in FIGS. 2 and 3. Such differences would be readily ascertainable by a skilled person in the art.

The voltage suppression circuit 104 is coupled to the DC supply rail 112. As is generally known, a voltage suppression circuit functions as a transient voltage suppressor, or a voltage clamp. In the depicted embodiment, the voltage suppression circuit 104 will clamp the DC voltage magnitude, as measured between the DC supply rail 112 and the return rail 114, to a predetermined maximum voltage magnitude. It will be appreciated that the predetermined maximum voltage may vary from circuit to circuit 100, but is selected to ensure that it is below the damage threshold of the circuits being protected. In some embodiments, the voltage suppression circuit 104 may additionally exhibit a minimum clamping voltage. In these embodiments, the minimum clamping voltage can be within the normal operating voltage of the circuits being protected.

The switch activation circuit 106 is coupled to the DC supply rail 112 and the return rail 114, and is configured to selectively supply a switch activation signal 116. The switch activation circuit 106 is configured to supply the switch activation signal 116 when the voltage magnitude, as measured between the DC supply rail 112 and the return rail 114, exceeds a predetermined threshold value. The specific threshold voltage may vary, but is selected so that the switch activation signal 116 is supplied only for voltage transients indicative of a lightning strike, and not during normal circuit operating conditions.

The solid-state switch 108 is electrically connected in series with the voltage suppression circuit 104 and the return rail 114, and is coupled to receive the switch activation signal 116 that is selectively supplied by the switch activation circuit 106. The solid-state switch 108 is configured, in response to receiving the switch activation signal 116, to switch from an OFF state to an ON state. In the OFF state, the solid-state switch 108 electrically isolates the voltage suppression circuit 104 from the return rail 114. As a result, any leakage current through the voltage suppression circuit 104 is limited to that of the solid-state switch. Conversely, in the ON state, the solid-state switch 108 electrically couples the voltage suppression circuit 104 to the return rail 114. As a result, current may flow through the voltage suppression circuit 104, which will in turn clamp the voltage magnitude, as measured between the DC supply rail 112 and the return rail 114, to the predetermined maximum voltage magnitude.

Figure 4:
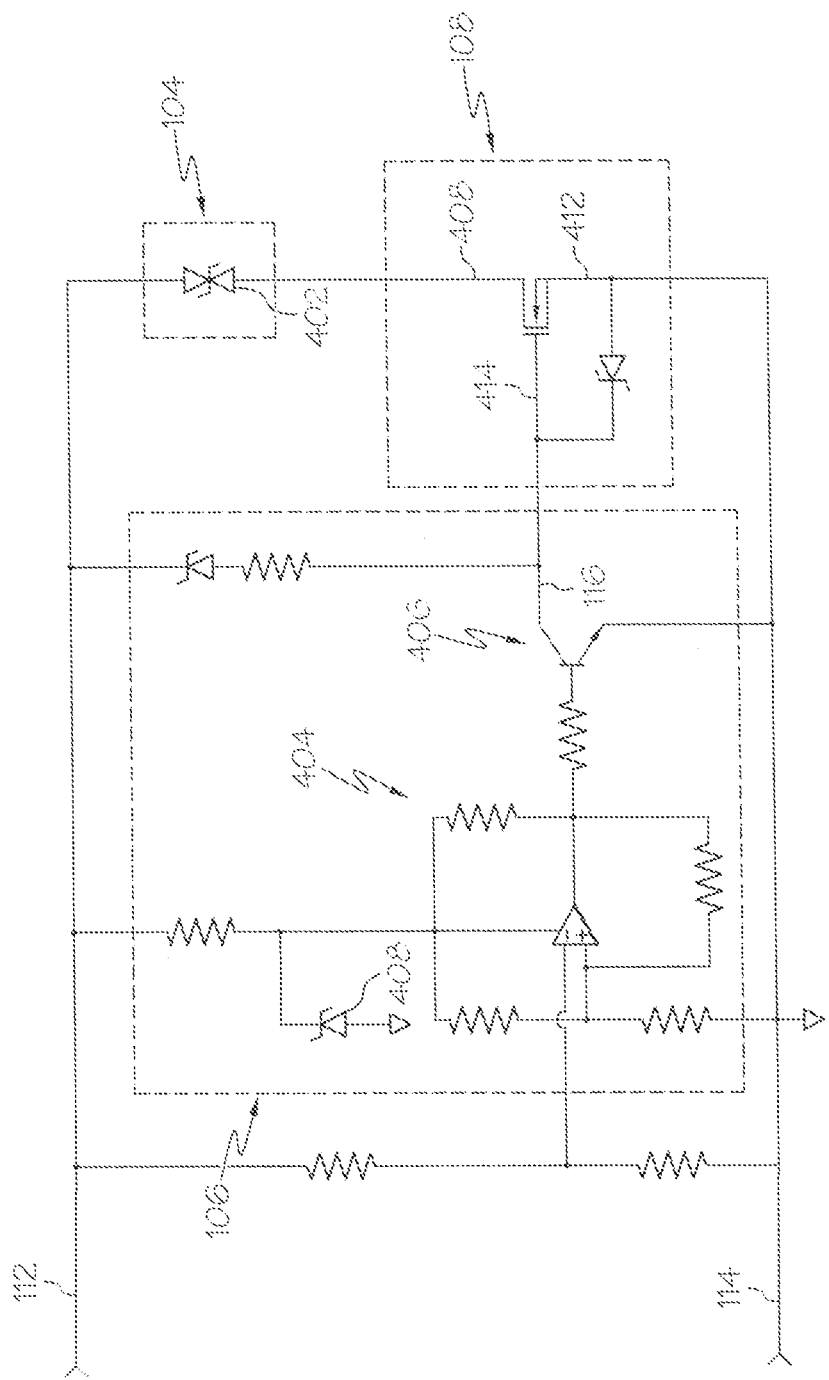
FIG. 4 depicts a schematic diagram of yet another particular implementation of the switched TVS circuit depicted in FIG. 1.

The TVS circuit 100 may be variously configured to implement the above-described functionality. Some exemplary particular configurations are depicted in FIGS. 2-4 and will be briefly described, beginning with the embodiment in FIG. 2. In this embodiment, the voltage suppression circuit 104 is implemented using one or more bidirectional TVS diodes 202 (or voltage suppressors). Although the depicted embodiment is implemented using only one bidirectional voltage suppression 202, it will be appreciated that it could be implemented using two or more series-connected bidirectional voltage suppressors 202.

The switch activation circuit 106 is implemented using a conventional diode 204, a zener diode 206, a capacitor 208, and a voltage divider resistor network 212. The operation of the conventional diode 204 and the zener diode 206 are generally well known, and need not be described. It is noted, however, that the zener diode 206 is selected to set the voltage threshold at which it is desired for the solid-state switch 108 to transition from the OFF state to the ON state. The capacitor 208 is selected to act as a noise filter and prevent inadvertent activation of the solid-state switch 108. The voltage divider resistor network 212 is coupled to the solid-state switch 108 and supplies the switch activation signal 116 thereto.

The solid-state switch 108 in the depicted embodiment is implemented using a silicon-controlled rectifier (SCR). As shown, the SCR 108 has its anode terminal 214 coupled to the TVS diode 202, its cathode terminal 216 coupled to the return rail 114, and its gate terminal 218 coupled to receive the switch activation signal 116 from the voltage divider resistor network 212.

With the embodiment depicted in FIG. 2, if the circuit 100 experiences a voltage transient due, for example, to a lightning strike, the voltage of the DC supply rail 112 will increase. When the voltage increases above the knee voltage of the zener diode 206, the switch activation circuit 106 will supply the switch activation signal 116 to the gate terminal 218 of the SCR 108. As a result, the SCR 108 will transition to the ON state, and the voltage suppression 202 will conduct. As is generally known, the SCR 108 will remain in the ON state until current no longer flows through the voltage suppression 202.

The embodiment depicted in FIG. 2 is used to provide transient voltage protection for a single circuit. It will be appreciated, however, that it may be used to provide protection for a plurality of circuits. To do so, as shown in FIG. 3, the circuit 100 includes a plurality of voltage suppressions 202 (202-1, 202-2, 202-3, . . . 202-N), with each voltage suppression 202 separately connected to a different DC supply rail 112 (112-1, 112-2, 112-3, . . . 112-N), but all connected to the solid-state switch 108. The switch activation circuit 106 is separately connected to each of the DC supply rails 112 (112-1, 112-2, 112-3, . . . 112-N), via a plurality of conventional diodes 204 (204-1, 204-2, 204-3, . . . 204-N), and a single connection to the solid-state switch 108.

Turning now to FIG. 4, the voltage suppression circuit 104 of this embodiment is also implemented using one or more bidirectional TVS diodes 402 (or voltage suppressors). Although the depicted embodiment is implemented using only one bidirectional voltage suppression 402, it will be appreciated that it too could be implemented using two or more series-connected bidirectional voltage suppressors 402.

The switch activation circuit 106 is implemented using a conventional comparator circuit 404 and a level translating transistor circuit 406. The operation of these devices is generally well known, and need not be described. It is noted, however, that the comparator circuit 404 includes a zener diode 408, which limits the comparator supply voltage and sets the voltage threshold at which it is desired for the solid-state switch 108 to transition from the OFF state to the ON state.

The solid-state switch 108 in the depicted embodiment is implemented using a field-effect transistor (FET), and more particularly a metal-oxide-semiconductor FET (MOSFET). In the depicted embodiment, the MOSFET 108 has its drain terminal 408 coupled to the TVS diode 402, its source terminal 412 coupled to the return rail 114, and its gate terminal 414 coupled to receive the switch activation signal 116 from the level translating transistor circuit 406.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A switched transient voltage suppression circuit, comprising:
    a voltage suppression circuit adapted to be coupled to a power supply rail, the voltage suppression circuit comprising a plurality of series-connected transient voltage suppression diodes;
    a switch activation circuit adapted to be coupled to at least the power supply rail and configured to selectively supply a switch activation signal; and
    a solid-state switch electrically connected in series with the voltage suppression circuit and adapted to be coupled to a power supply return rail, the solid-state switch further coupled to receive the switch activation signal selectively supplied by the switch activation circuit and configured, in response to the switch activation signal, to switch from an OFF state, in which the voltage suppression circuit is electrically isolated from the power supply return rail, to an ON state, in which the voltage suppression circuit is electrically coupled to the power supply return rail.

2. The circuit of claim 1, wherein the solid-state switch comprises a silicon controlled rectifier circuit (SCR).

3. The circuit of claim 1, wherein the solid-state switch comprises a transistor circuit.

4. The circuit of claim 3, wherein the transistor circuit comprises a field-effect transistor (FET).

5. The circuit of claim 4, wherein the field-effect transistor is a metal-oxide-semiconductor FET (MOSFET).

6. The circuit of claim 1, wherein the switch activation circuit is configured to supply the switch activation signal when a voltage potential between the power supply rail and the return rail exceeds a predetermined threshold voltage magnitude.

7. The circuit of claim 1, wherein the switch activation circuit comprises:
    a first diode, a zener diode, and an impedance matching circuit all electrically connected in series between the power supply rail and the return rail.

8. The circuit of claim 1, wherein the switch activation circuit comprises a comparator circuit.

9. The circuit of claim 1, further comprising:
    one or more additional voltage suppression circuits, each additional voltage suppression circuit individually connected in series with the solid-state switch and adapted to be coupled to a separate power supply rail that is independent of all other power supply rails; and
    one or more additional switch activation circuits, each additional switch activation circuit adapted to be coupled to one of the separate power supply rails and configured to selectively supply an individual switch activation signal to the solid-state switch.

10. A circuit for supplying electrical power to one or more electrical loads, comprising:
    a first direct current (DC) power source coupled to a DC supply rail and a return rail and configured to supply electrical power at a DC voltage magnitude between the DC supply rail and the return rail;
    a second direct current (DC) power source coupled to a second DC supply rail and the return rail and configured to supply electrical power at a DC voltage magnitude, as measured between the second DC supply rail and the return rail;
    a first voltage suppression circuit coupled to the DC supply rail;
    a second voltage suppression circuit coupled to the second DC supply rail;
    a first switch activation circuit coupled to at least the DC supply rail and configured to selectively supply a first switch activation signal;
    a second switch activation circuit coupled to at least the second DC supply rail and configured to selectively supply a second switch activation signal to the solid-state switch; and
    a solid-state switch electrically connected in series with the first and second voltage suppression circuits and the return rail, the solid-state switch further coupled to receive the first or second switch activation signals selectively supplied by the first or second switch activation circuits, respectively, and configured, in response to the first or second switch activation signal, to switch from an OFF state, in which the solid-state switch electrically isolates the first and second voltage suppression circuit from the return rail, to an ON state, in which the solid-state switch electrically couples the first and second voltage suppression circuits to the return rail.

11. The circuit of claim 10, wherein the solid-state switch comprises a silicon controlled rectifier circuit (SCR).

12. The circuit of claim 10, wherein the solid-state switch comprises a metal-oxide-semiconductor field effect transistor (MOSFET).

13. The circuit of claim 10, wherein the first and second switch activation circuits are configured to supply the first and second switch activation signals, respectively, when a voltage potential between the first and second DC supply and return rails exceeds a predetermined threshold voltage magnitude.

14. The circuit of claim 10, wherein the first and second switch activation circuits each comprise:
    a diode, a zener diode, and an impedance matching circuit all electrically connected in series between the DC supply rail and the return rail.

15. The circuit of claim 10, wherein the first and second switch activation circuits each comprise a comparator circuit.

16. The circuit of claim 10, wherein the first and second voltage suppression circuits each comprise a transient voltage suppression diode.

17. The circuit of claim 10, wherein the first and second voltage suppression circuits each comprise a plurality of series-connected transient voltage suppression diodes.

18. A switched transient voltage suppression circuit, comprising:
- a voltage suppression circuit adapted to be coupled to a power supply rail;
- a switch activation circuit adapted to be coupled to at least the power supply rail and configured to selectively supply a switch activation signal;
- a solid-state switch electrically connected in series with the voltage suppression circuit and adapted to be coupled to a power supply return rail, the solid-state switch further coupled to receive the switch activation signal selectively supplied by the switch activation circuit and configured, in response to the switch activation signal, to switch from an OFF state, in which the voltage suppression circuit is electrically isolated from the power supply return rail, to an ON state, in which the voltage suppression circuit is electrically coupled to the power supply return rail;
- one or more additional voltage suppression circuits, each additional voltage suppression circuit individually connected in series with the solid-state switch and adapted to be coupled to a separate power supply rail that is independent of all other power supply rails; and
- one or more additional switch activation circuits, each additional switch activation circuit adapted to be coupled to one of the separate power supply rails and configured to selectively supply an individual switch activation signal to the solid-state switch.

* * * * *